(12) United States Patent
Dubey et al.

(10) Patent No.: US 11,531,948 B2
(45) Date of Patent: Dec. 20, 2022

(54) ARTIFICIAL INTELLIGENCE BASED SYSTEM AND METHOD FOR DYNAMIC GOAL PLANNING

(71) Applicant: Accenture Global Solutions Limited, Dublin (IE)

(72) Inventors: Alpana Dubey, Bangalore (IN); Kumar Abhinav, Hazaribag (IN); Sakshi Jain, Bangalore (IN); Veenu Arora, Sri Ganganagar (IN)

(73) Assignee: Accenture Global Solutions Limited, Dublin (IE)

( * ) Notice: Subject to any disclaimer, the term of this patent is extended or adjusted under 35 U.S.C. 154(b) by 500 days.

(21) Appl. No.: 16/794,786

(22) Filed: Feb. 19, 2020

(65) Prior Publication Data
US 2021/0256434 A1 Aug. 19, 2021

(51) Int. Cl.
*G06Q 10/06* (2012.01)
*G06N 5/04* (2006.01)
*G06N 3/04* (2006.01)

(52) U.S. Cl.
CPC ....... *G06Q 10/0633* (2013.01); *G06N 3/0445* (2013.01); *G06N 5/043* (2013.01); *G06Q 10/06316* (2013.01)

(58) Field of Classification Search
None
See application file for complete search history.

(56) References Cited

U.S. PATENT DOCUMENTS

| | | | |
|---|---|---|---|
| 2017/0351663 A1* | 12/2017 | Sordoni | G06F 40/30 |
| 2018/0307679 A1* | 10/2018 | Duong | G06F 40/30 |
| 2020/0242444 A1* | 7/2020 | Zhang | G06N 3/006 |
| 2021/0097140 A1* | 4/2021 | Chatterjee | G06N 5/022 |

(Continued)

OTHER PUBLICATIONS

Chen et al., "A survey on dialogue systems: Recent advances and new frontiers." Acm Sigkdd Explorations Newsletter 19.2 (2017): 25-35 (Year: 2017).*

(Continued)

*Primary Examiner* — Christopher B Tokarczyk
(74) *Attorney, Agent, or Firm* — Plumsea Law Group, LLC

(57) ABSTRACT

The disclosed system and method provide a way to create, update, and execute dynamic goal plans. Updating a dynamic goal plan may be based on the initial sequence of actions of the goal plan as well as the corresponding states of the actions. By using a sequence to sequence model, a goal plan can still be processed when the length of the input (initial sequence of actions) differs from the length of the output (updated sequence of actions). A sequence to sequence model can determine the interdependencies between actions that can contribute to the optimal order in which actions can efficiently be performed. A single layer neural network or clustering can be used to approximate the state of a goal plan that may be capable infinite states. This approximation improves accuracy in capturing the state of a goal plan, thereby improving accuracy in predicting the future state of a system, which can help with planning (e.g., gathering resources in advance). Projects involving collaboration between virtual and/or human assistants can greatly benefit from the ability to update a dynamic goal plan in real time.

20 Claims, 8 Drawing Sheets

(56) References Cited

U.S. PATENT DOCUMENTS

2022/0027577 A1* 1/2022 Duan .................. G06F 40/42

OTHER PUBLICATIONS

Kravari et al., "A survey of agent platforms." Journal of Artificial Societies and Social Simulation 18.1 (2015): 11., <URL: http://jasss.soc.surrey.ac.uk/18/1/11.html>, retrieved Aug. 11, 2020.
"Dialogow", https://dialogflow.com/, accessed on Dec. 15, 2018.
"LUIS", https://www.luis.ai/, accessed on Dec. 15, 2018.
"IBM Watson", <URL: https://www.ibm.com/watson/>, accessed on Dec. 15, 2018.
"Human AI Teaming Framework", <URL: https://youtu.be/INyrrk8dMqU>, accessed on Dec. 15, 2018.

* cited by examiner

Basic Information

Name*
troubleshoot_machine

Short Name*
troubleshoot

Description
Coordinate with operators to troubleshoot machines

Triggered Through:
Utterances

Utterances

| Machine is facing problem with Oil leakage ✕ | There is some issue with valve and due to thich oil leakag... ✕ |

+ Domain

FIG. 2

ARTIFICIAL INTELLIGENCE BASED SYSTEM AND METHOD FOR DYNAMIC GOAL PLANNING

TECHNICAL FIELD

The present disclosure generally relates to using machine learning to create and update goal plans. More specifically, the present disclosure generally relates to using a state of a system to determine a sequence of actions to be performed by a virtual assistant in a dynamic goal plan.

BACKGROUND

A plan can be simple to execute and finish when the plan involves only a single action or a set of static actions. For example, a plan for accomplishing turning off the lights in a building can include a set of static, independent actions (e.g., turning off a light in room A, turning off a light in room B, turning off a light in room C, etc.). Turning off the light in one room does not change the fact that a light must be turned off in another room. However, when a plan involves multiple interdependent actions meant to collectively accomplish a goal or objective the state of one action can change whether another action is to be performed. For example, a plan for troubleshooting a machine may include a series of steps meant to rule out common problems with a machine. Upon visual inspection of the machine, an operator may quickly determine that a part needs to be replaced and that this has been the cause of the failure of the machine. Thus, the series of steps no longer need to be followed to troubleshoot the machine. Accordingly, in this moment, the series of steps meant to rule out common problems are no longer relevant to the troubleshooting plan and steps not included in the original plan for troubleshooting (e.g., steps of ordering parts) are now necessary. Thus, the original plan is no longer the optimal way of accomplishing a goal.

A dynamic plan that is to be at least partially carried out by virtual assistants is particularly complex, as virtual agents do not typically have the ability to change a plan based on changes in circumstances in real time.

There is a need in the art for a system and method that addresses the shortcomings discussed above.

SUMMARY

In the context of this disclosure, a goal plan can be defined by a sequence of actions (e.g., human and/or AI actions) meant to accomplish a goal when executed in the order of the sequence. The disclosed system and method provide a way to create, update, and execute dynamic goal plans. In other words, as the state of a goal plan changes over time, the goal plan can be adapted to accommodate its dynamic nature. Dynamic goal plans may be present in many different projects, particularly in projects including a collaboration between virtual (or artificial intelligence (AI)) assistants and/or human assistants. The disclosed system and method use machine learning to analyze the sequence of actions defining a plan as well as the state of each action to update the plan by rearranging the order of the actions and/or eliminating/adding actions to the sequence of actions. By using a sequence to sequence model, a goal plan can still be processed when the length of the input (initial sequence of actions) differs from the length of the output (updated sequence of actions). Additionally, a sequence to sequence model can determine the interdependencies between actions that can contribute to the optimal order in which actions can efficiently be performed. By using a single layer neural network or by clustering the states of the actions in a goal plan, the disclosed system and method can approximate the state of a goal plan that may be capable of infinite states. This approximation improves the accuracy of capturing the state of a goal plan when serving as input in determining a sequence of actions fit for the current state of the goal plan. Accurately determining the current state of the system can help with accurately predicting the future state of a system, which is important in planning (e.g., gathering resources in advance).

In one aspect, the disclosure provides a computer implemented method of using updating a dynamic goal plan. The method may include receiving an initial goal plan comprising an initial action sequence including a plurality of actions ordered in a forward direction. The method may include processing the initial action sequence through an encoder of a bidirectional recurrent neural network ("RNN") to generate an encoder output, including a first hidden state representation. The method may include processing the encoder output through a decoder of the bidirectional RNN to generate a decoder output, including a forward hidden state representation and a backward hidden state representation for each action of the initial action sequence. The method may include applying a context vector to the decoder output to generate a weighted decoder output. The method may include obtaining a state of the initial goal plan, wherein the state of the initial goal plan includes a plurality of states each corresponding to an action of the initial goal plan. The method may include converting the state of the initial goal plan into vector embeddings. The method may include concatenating the weighted decoder output with the vector embeddings. The method may include processing the concatenated weighted decoder output and vector embeddings through a SoftMax classifier to determine an updated goal plan In yet another aspect, the disclosure provides a non-transitory computer readable medium storing software that may comprise instructions executable by one or more computers which, upon execution, cause the one or more computers to: (1) receive an initial goal plan comprising an initial action sequence including a plurality of actions ordered in a forward direction; (2) process the initial action sequence through an encoder of a bidirectional recurrent neural network ("RNN") to generate an encoder output, including a first hidden state representation; (3) process the encoder output through a decoder of the bidirectional RNN to generate a decoder output, including a forward hidden state representation and a backward hidden state representation for each action of the initial action sequence; (4) apply a context vector to the decoder output to generate a weighted decoder output; (5) obtain a state of the initial goal plan, wherein the state of the initial goal plan includes a plurality of states each corresponding to an action of the initial goal plan; (6) convert the state of the initial goal plan into vector embeddings; (7) concatenate the weighted decoder output with the vector embeddings; and (8) process the concatenated weighted decoder output and vector embeddings through a SoftMax classifier to determine an updated goal plan.

In yet another aspect, the disclosure provides a system for updating a dynamic goal plan, which comprises one or more computers and one or more storage devices storing instructions that may be operable, when executed by the one or more computers, to cause the one or more computers to: (1) receive an initial goal plan comprising an initial action sequence including a plurality of actions ordered in a forward direction; (2) process the initial action sequence through an encoder of a bidirectional recurrent neural network ("RNN") to generate an encoder output, including a first hidden state representation; (3) process the encoder output through a decoder of the bidirectional RNN to generate a decoder output, including a forward hidden state representation and a backward hidden state representation for each action of the initial action sequence; (4) apply a context vector to the decoder output to generate a weighted decoder output; (5) obtain a state of the initial goal plan, wherein the state of the initial goal plan includes a plurality of states each corresponding to an action of the initial goal plan; (6) convert the state of the initial goal plan into vector embeddings; (7) concatenate the weighted decoder output with the vector embeddings; and (8) process the concatenated weighted decoder output and vector embeddings through a SoftMax classifier to determine an updated goal plan.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 2 shows a screenshot of a user interface according to an embodiment.

DESCRIPTION OF EMBODIMENTS

Figure 1:
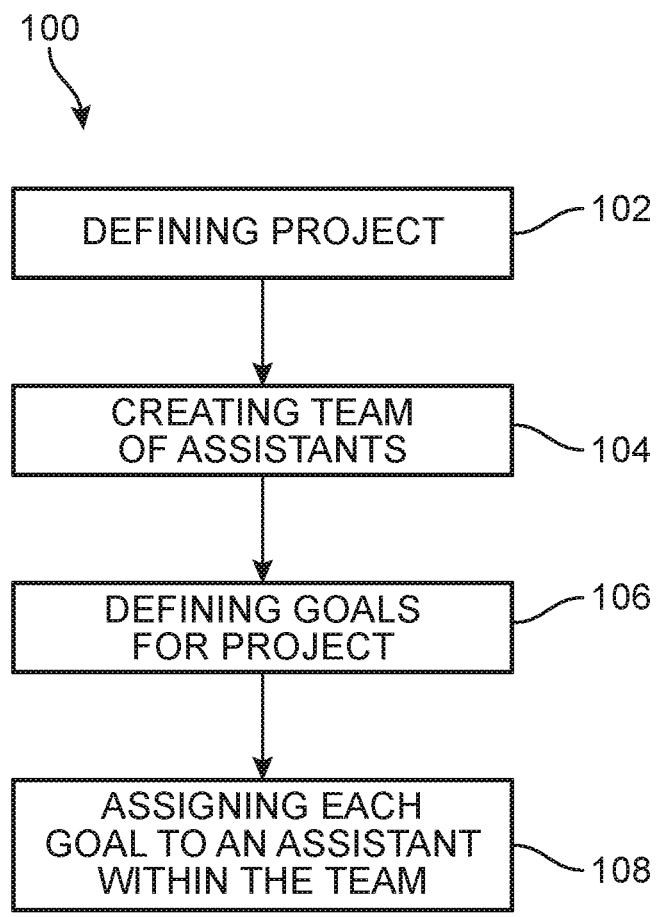
FIG. 1 is a flowchart showing the creation of a project in a framework involving dynamic goal plans according to an embodiment.

To understand how dynamic goal plans may be updated, it is helpful to understand how goal plans may be created in a system or framework involving dynamic goal plans. In some embodiments, a framework may provide user interface with a questionnaire and/or fillable form for creating a project. FIG. 1 is a flowchart showing the creation of a project in a framework involving dynamic goal plans according to an embodiment. In this embodiment, a project is defined by a team of assistants (e.g., human and/or AI assistants), a set of goals, and the assignment of the goals to individual assistants of the team. For example, method 100 includes defining a project (operation 102). Operation 102 may include creating a project name (e.g., oil and gas field service), selecting a project type (e.g., WebApps development), selecting a project domain type (e.g., oil and gas), and/or filling in a project description (e.g., project helps the lease operator and production foreman to collaborate with various AI assistants for issue resolution). Another example of project name is "Postal Application." This exemplary project may be a Web Apps development project type in the postal service domain. A description for this project may say "developing postal application of Human AI principles, human and AI assistants will collaborate with each other to resolve customer queries."

Method 100 includes creating a team of assistants (operation 104). The team of assistants may be human assistants and/or AI assistants. In some embodiments, a framework provides a user interface in which team types can be selected. For example, a user interface may present the following options of team types:

Application with AI assistants and human;

Application with apprentice AI assistants and human trainer;

Basic application with AI assistant and human in loop; and

Application with AI assistants, human, and crowd assistant.

The AI assistants may be prebuilt assistants selected from a library in the framework or may be custom-built assistants designed for a particular project. Prebuilt assistants may have features/services/capabilities that are useful across many applications/domains. In some embodiments, a framework may recommend prebuilt assistants based on domain, project type, or other factors. Examples of prebuilt assistants are a knowledge retrieval assistant, a social media assistant, and a profile assistant. A knowledge retrieval assistant may be an assistant capable of looking up information (e.g., on the Internet, documents, and/or in databases). For example, a knowledge retrieval assistant in a package tracking project may be capable of retrieving tracking numbers of packages and/or locations of mailing facilities. A social media assistant may analyze information available on social media. A profile assistant may assist an operator (e.g., a human operator at a computer or in the field) by providing a customer's profile information.

In embodiments in which operation 104 includes creating a team with custom-built assistants, these assistants may be defined through a user interface provided by the framework. For example, operation 104 may include defining a human assistant by selecting a role for the human assistant (e.g., explainer) and providing a description (e.g., helps in queries related to postal tracking). In another example, operation 104 may include defining an AI assistant by selecting a role for the AI assistant (e.g., tracking assistant), providing a description (e.g., tracking assistant helps in locating the package details), providing a short name (e.g., tracking_assistant), and selecting a domain (e.g., postal). In another example, an AI assistant may be defined with the following information:

Name: troubleshooting assistant;
Short Name: troubleshooting_assistant;
Description: troubleshooting assistant helps in identifying and resolving issues with the product; and
Domain: oil and gas.

Method 100 includes defining goals for project (operation 106). Operation 106 may include creating a goal name (e.g., track package), providing a short name (e.g., track_package), providing a goal description (e.g., track customers package based on the consignment number). Operation 106 may further include selecting how the goal is triggered (e.g., through utterances or detection of events). In embodiments in which utterances are selected, particular utterances meant to trigger the goal can be provided to the framework. For example, the goal of track package may be triggered by the utterance of "package not yet received." This utterance, in addition to other utterances provided or selected by the user may be used to train a supervised machine learning algorithm to identify goals from the utterance using a technique for extracting features from text (e.g., using bag-of-words). FIG. 2 shows a screenshot 200 of a user interface according to an embodiment. In this screenshot, a goal has been defined by a goal name (#troubleshoot_machine), a short name (troubleshoot), and description (coordinate with operators to troubleshoot machines). The goal is further described as being triggered through utterances and the defined utterances include the following:

"Machine is facing problem with oil leakage;" and
"There is some issue with valve and due to which oil leakage occurring."

The defined utterances may be used to train a supervised machine learning algorithm to identify goals from the utterance (e.g., using the bag-of-words feature). The framework may use a natural language processing (NLP) services (e.g., DialogFlow) to detect the goals from the user's utterance.

In some embodiments, instead of or in addition to utterances, the goal may be defined with software events that can trigger the initiation of goal execution. For example, an event may be a predetermined time or state, such as a particular pressure point, a predetermined parameter(s), or the completion of another goal defined in the project. In some embodiments, Internet of Things (IoT) sensors may be used to capture one or more parameters of a system (e.g., a machine). In such an embodiment, users can define rules or build a machine learning model that can specify if the values for these parameters have reached a certain state that can be assigned as an event that triggers the initiation of goal execution. As with utterances that trigger initiation, the user interface may be used to specify which event can trigger a goal.

In some embodiments, the goal may further be defined by domain (e.g., oil and gas or postal). The goal may still further be defined by parameters. For example, a parameter may include a machine name because this information is necessary for troubleshooting the machine. In another example, the parameter may include a consignment number necessary for tracking a package. In some embodiments, these parameters may be automatically recognized from a user's utterance. As discussed above, the goal can be detected based on a human user or assistant's utterance or any user-defined events. For example, suppose the service engineer asks the knowledge retrieval assistant, "Can you provide me the specification for model XYZ?" The goal here is to "retrieve machine specification" and parameter is "Model XYZ".

In some embodiments, when defining a goal, the required behavior or actions (e.g., retrieving specifications for a particular machine model—the logic for this action can be specified by a developer/user) performed by an assistant may be described. In some embodiments, this capability may be provided by a goal behavior component of the framework. In some embodiments, the actions may be interdependent.

In some embodiments, the user interface may be used to further define a goal with pre-condition(s) and/or post-condition(s). For example, a set of pre-conditions may be included as requirements that must be true for a given behavior. The system may validate the pre-condition before executing the goal's behavior and the post-condition after goal's behavior execution. An example of a pre-condition can include validating that an instruction manual is for the specified machine before retrieving the instruction manual. A post-condition in this example may include ensuring that instruction manual is available after obtaining or retrieving.

The pre-condition and post-condition can be complex logic. The system can support evaluating logical and conditional statements of pre-conditions and post-conditions. Upon the goal's behavior execution, the assistant executing the goal is responsible for updating the status of the goal to a goal plan module, discussed in more detail below. The execution of goal behavior may be adapted based on the dynamic situation such as context, environment, dependency between the agents for the shared goal, new goals, etc.

Method 100 includes assigning each goal to an assistant within the team (operation 108). In some embodiments, the user interface may be used to select an assistant from the project team to assign to each goal. It is understood that an assistant may be assigned more than one goal. In some embodiments, a goal may include more than one action and these actions may each be performed by different assistants. The assignment of goals to assistants may be published/registered in the manner discussed with respect to directory facilitator agent below.

It is understood that the operations performed in any of the disclosed methods or processes may be performed in any order. For example, operation 104 may occur after operation 106.

Figure 3:
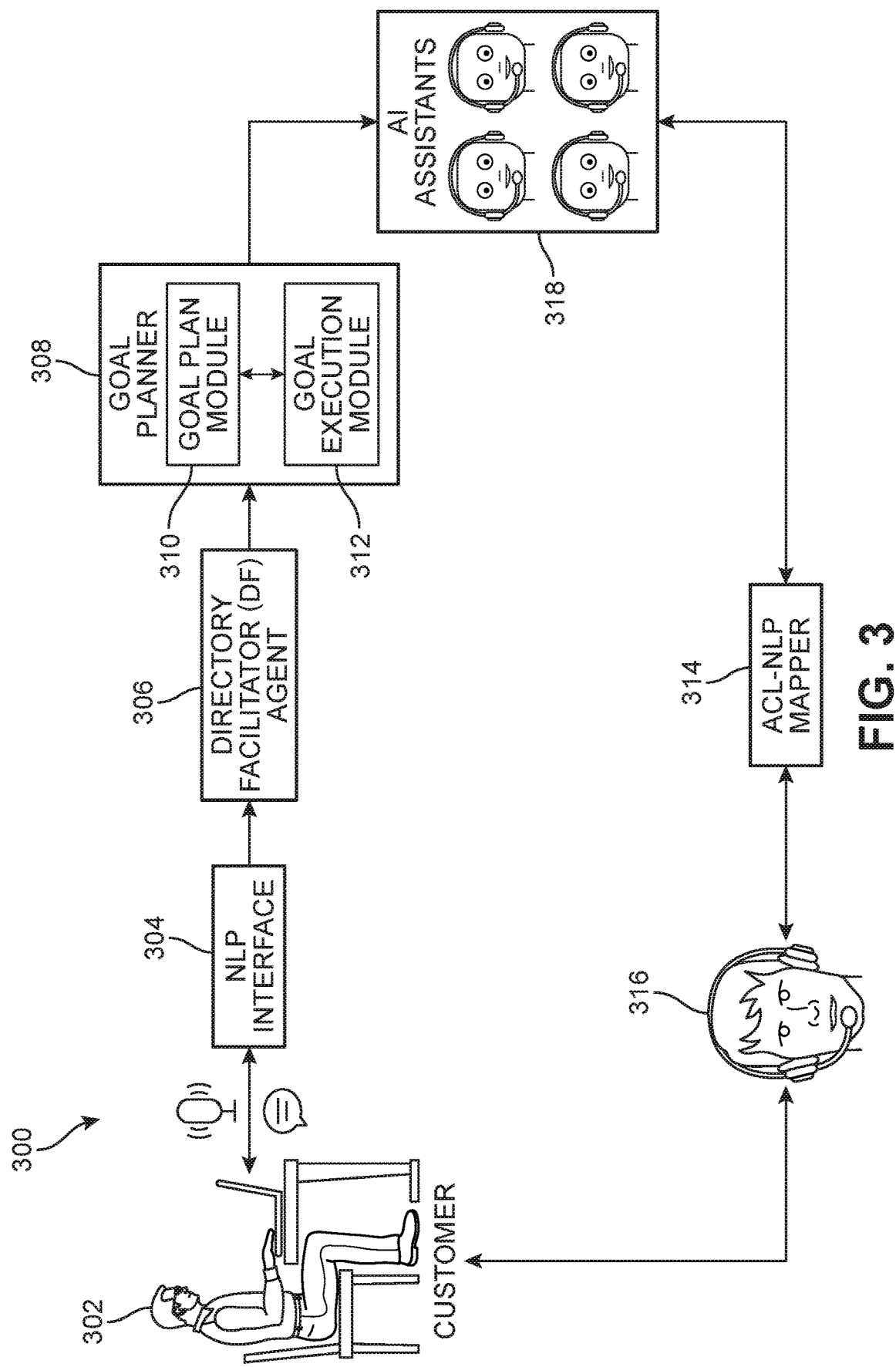
FIG. 3 is a system for creating, updating, and executing a goal plan according to an embodiment.
Figure 8:
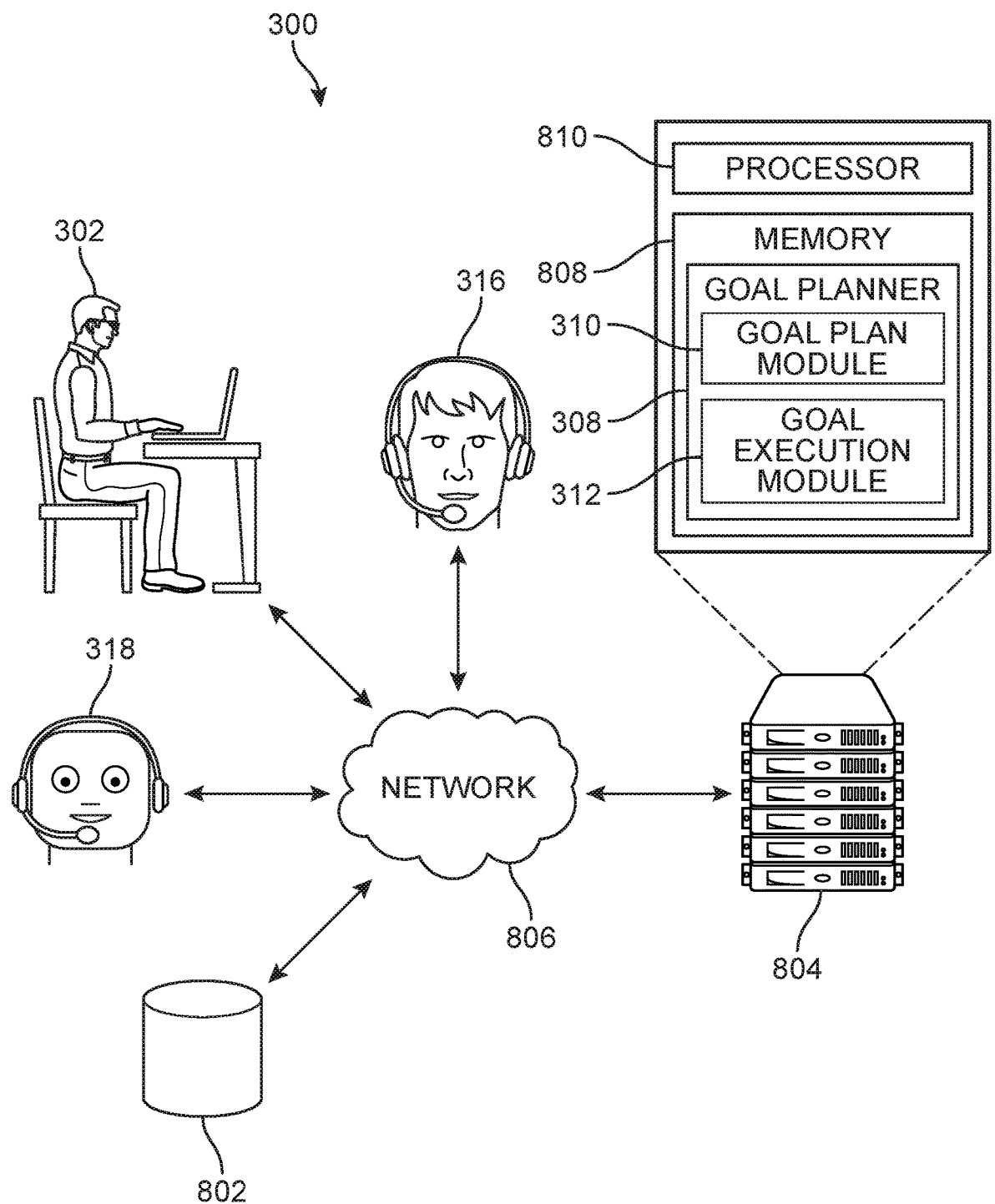
FIG. 8 is a system for creating, updating, and executing a goal plan according to an embodiment.

FIG. 3 is a schematic diagram of a system for creating, updating, and executing a goal plan 300 (or system 300 or framework 300) according to an embodiment. System 300 may include an NLP interface 304, a directory facilitator (DF) agent 306, a goal planner 308, a team of AI assistants 318, and an Agent Communication Language and NLP (ACL-NLP) mapper interface 314. FIG. 8 is another view of system 300 showing components in communication with one another via network 806. In some embodiments, network 806 may be a wide area network ("WAN"), e.g., the Internet. In other embodiments, network 806 may be a local area network ("LAN").

As shown in FIG. 8, goal planner 308 may be hosted in a computing system 804, which may have a memory 808 and a processor 810. Processor 810 may include a single device processor located on a single device, or it may include multiple device processors located on one or more physical devices. Memory 808 may include any type of storage, which may be physically located on one physical device, or on multiple physical devices. In some cases, computing system 804 may comprise one or more servers that are used to host goal planner 308. It is understood that user device of a human assistant 316 may be a component of the system and that the human assistant is not meant to be part of the system. In some embodiments, system 300 may include one or more IoT sensors connected to other components of system 300 through network 806.

Referring to FIG. 8, system 300 may further include a database 802, which store goal plans generated by goal planner 308. The goal plans may be retrieved by other components for system 300. For example, user 302 may retrieve the goal plan.

As shown in FIG. 3, during use, a customer 302 or other users may use a user device (e.g., computer or smartphone, etc.) to interact with system 300 to create, update, and/or execute a goal plan via NLP interface 304 that converts the user's utterances into messages that are useable by the other components of the system. DF agent 306 may include a specialized agent that provides a service for publishing the goals of projects. For example, in some embodiments, the DF agent may be provided by a framework such as JADE (Java Agent DEvelopment Framework), which provides a service called "Yellow Pages." ACL-NLP mapper interface 314 may facilitate communication between AI assistants 318 and a human assistants 316.

Each assistant publishes the goals it serves through the Yellow Pages service provided by Foundation for Intelligent Physical Agents (FIPA). Assistants can publish one or more of their goals to DF. When a user defines the goals and their corresponding assistant through the framework user interface, the framework may automatically generate a code to invoke the methods to publish and discover the assistants based on the goal.

In some embodiments, when a user defines the dependency between the goals of two agents through the framework user interface, the framework automatically generates the code to set up the communication between these two agents with the required message field parameters. The agents can communicate with each other to share information or direct the attention to other partners for any critical problem.

Goal planner 308 may include a goal plan module 310 and a goal execution module 312. Goal planner can generate and execute a goal plan (a sequence of actions defined by a goal) dynamically based on one or more goals. The goal plan module is responsible for creating a plan based on one or more goals defined within a project. Each plan is defined as a tuple <Goal_Id, Goal_Name, Agent_Id, States> where Goal_Id is the unique ID for each goal and randomly generated every time, Goal_Name is the name of the goal offered by the assistant, Agent_Id is the unique Id of the assistant (agent), and States is the execution status of the goal. The goal can be in several states during the entire execution, e.g. waiting, executing, failed, and success. When a plan is added to the goal planner, the execution status may be "waiting" by default. The goal plan module also provides the option to update the plan.

The goal execution module is responsible for executing the plan. This module may get the updated plan from the goal plan module and invoke the assistant assigned to the goal (i.e., responsible for executing the goal). The goal execution module may invoke the assigned assistant by specifying the goals with input parameters, which the assistant has to execute. The goal planning and execution capabilities may be available as a standard library of the disclosed framework. The framework may automatically take care of creating the plans at run-time and executing them. The goal planner may help in realizing "shared awareness" and "common ground", where each of the team members executing their goals will update their status to the goal plan module, so that each member is aware of other members' status and of the shared context. This also helps in ensuring "observability" as the assistants are aware of the progress towards goal.

Figure 4:
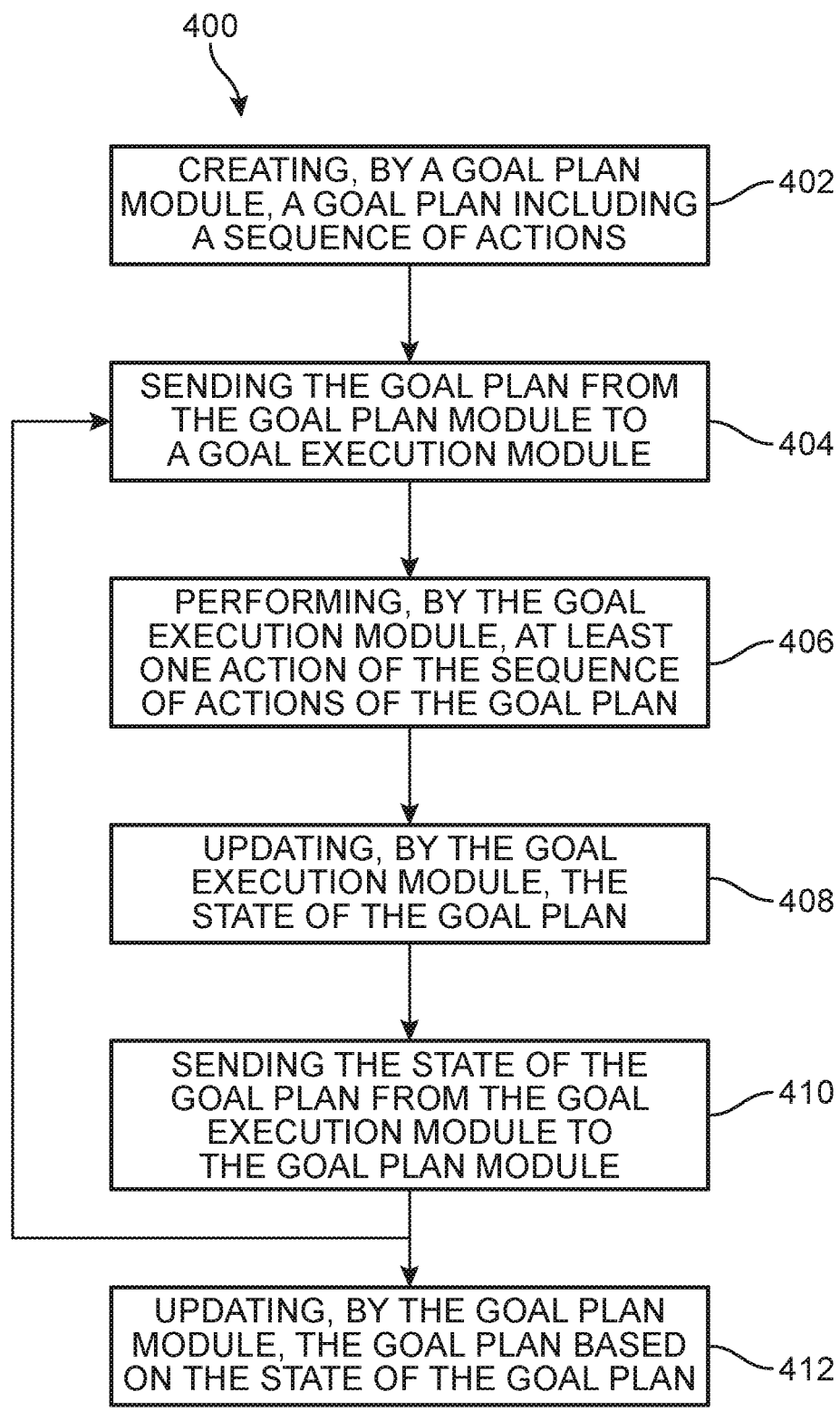
FIG. 4 shows a lifecycle of a goal according to an embodiment.

FIG. 4 shows a lifecycle of a goal 400 (or lifecycle 400) according to an embodiment. Lifecycle 400 may include creating, by a goal plan module, a goal plan including a sequence of actions (operation 402). For example, operation 402 may be performed according to the embodiment shown in FIG. 1. Lifecycle 400 may include sending the goal plan from the goal plan module to a goal execution module (operation 404). Lifecycle 400 may include performing, by the goal execution module, at least one action of the sequence of actions (operation 406). Lifecycle 400 may include updating, by the goal execution module, the state of the goal plan (operation 408). Lifecycle 400 may include sending the state of the goal plan from the goal execution module to the goal plan module (operation 410). Lifecycle 400 may include updating, by the goal plan module, the goal plan based on the state of the goal plan (operation 412). Then, this information is sent from the goal plan module to the goal execution module. Accordingly, the goal plan can be updated based on its state. In some embodiments, the goal plan may be continuously updated as the state of the goal plan changes.

Figure 5:
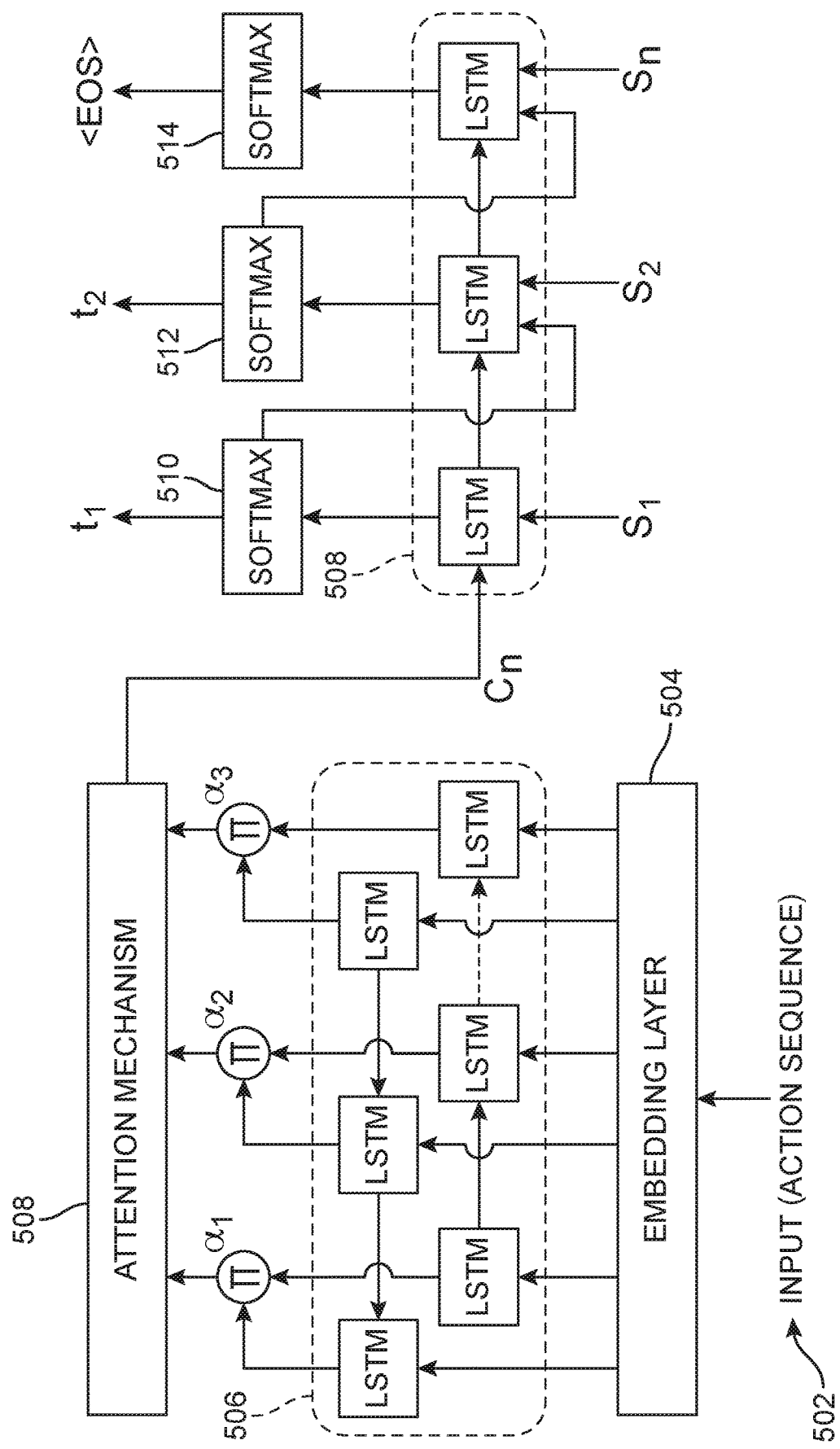
FIG. 5 shows the architecture for updating a dynamic goal plan according to an embodiment.

FIG. 5 shows the architecture for updating a dynamic goal plan 500 (or architecture 500) according to an embodiment. The architecture may include a sequence to sequence model including an encoder and decoders that are all layers of an RNN. For example, architecture 500 includes an embedding layer (or encoder) 504, a first decoder 506, an attention mechanism 508, a second decoder 508, a first SoftMax component 510, a second SoftMax component 512, and a third SoftMax component 514. Embedding layer 504 may be an encoder (e.g., one-hot encoding). First decoder 506 includes a bi-directional RNN in the form of a bi-directional long short-term memory (LSTM) having forward and backward LSTMs. It is understood that other bi-directional RNNs may be used in place of an LSTM. For example, a gated recurrent unit (GRU) may be used in place of an LSTM. First decoder 506 includes a first set of LSTM blocks arranged in a forward order and a second set of LSTM blocks (above the first set of blocks) arranged in a backward order, as shown by arrows in FIG. 5.

Figure 6:
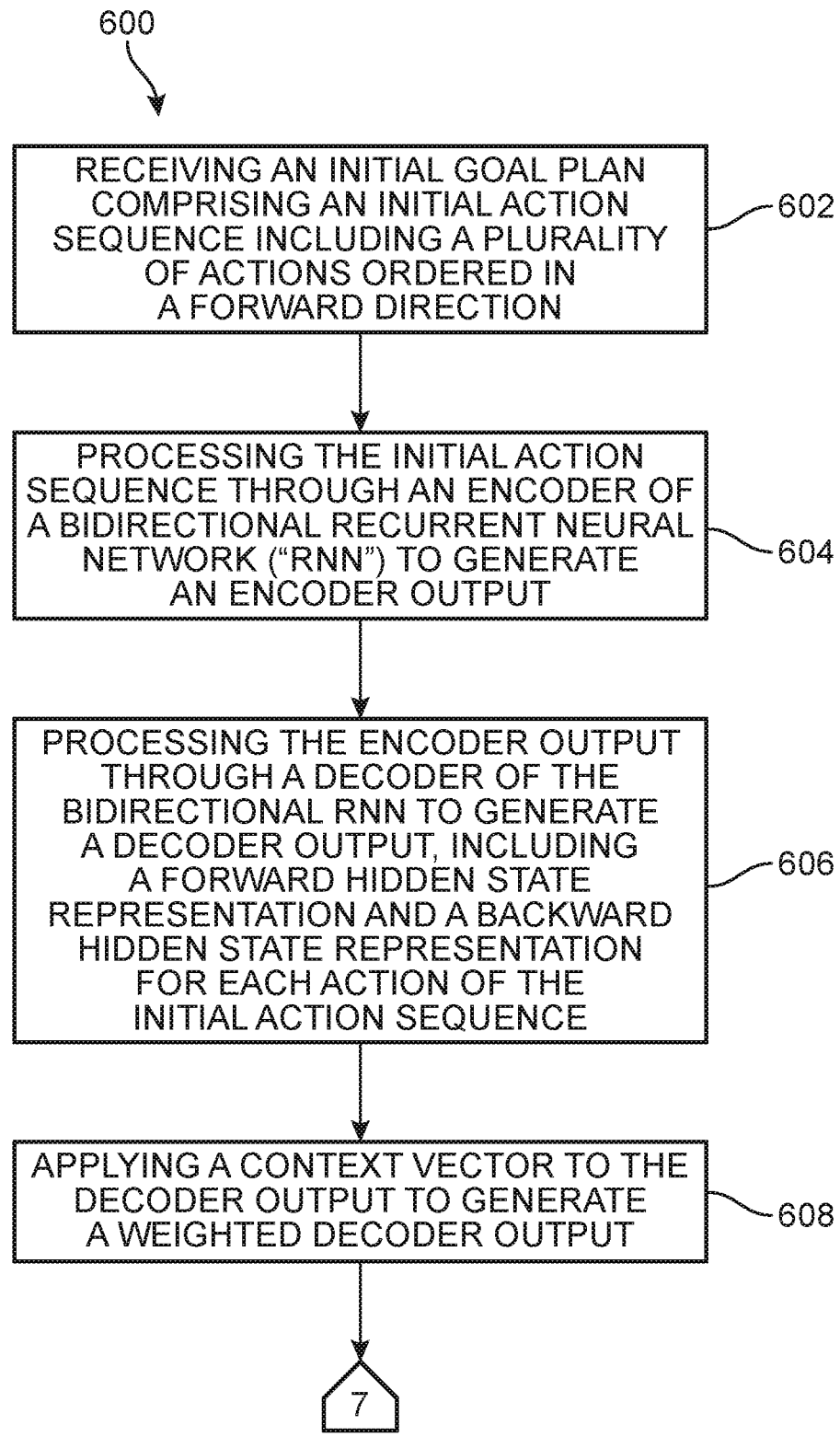
FIGS. 6-7 show a flowchart illustrating a method of updating a dynamic goal plan according to an embodiment.
Figure 7:
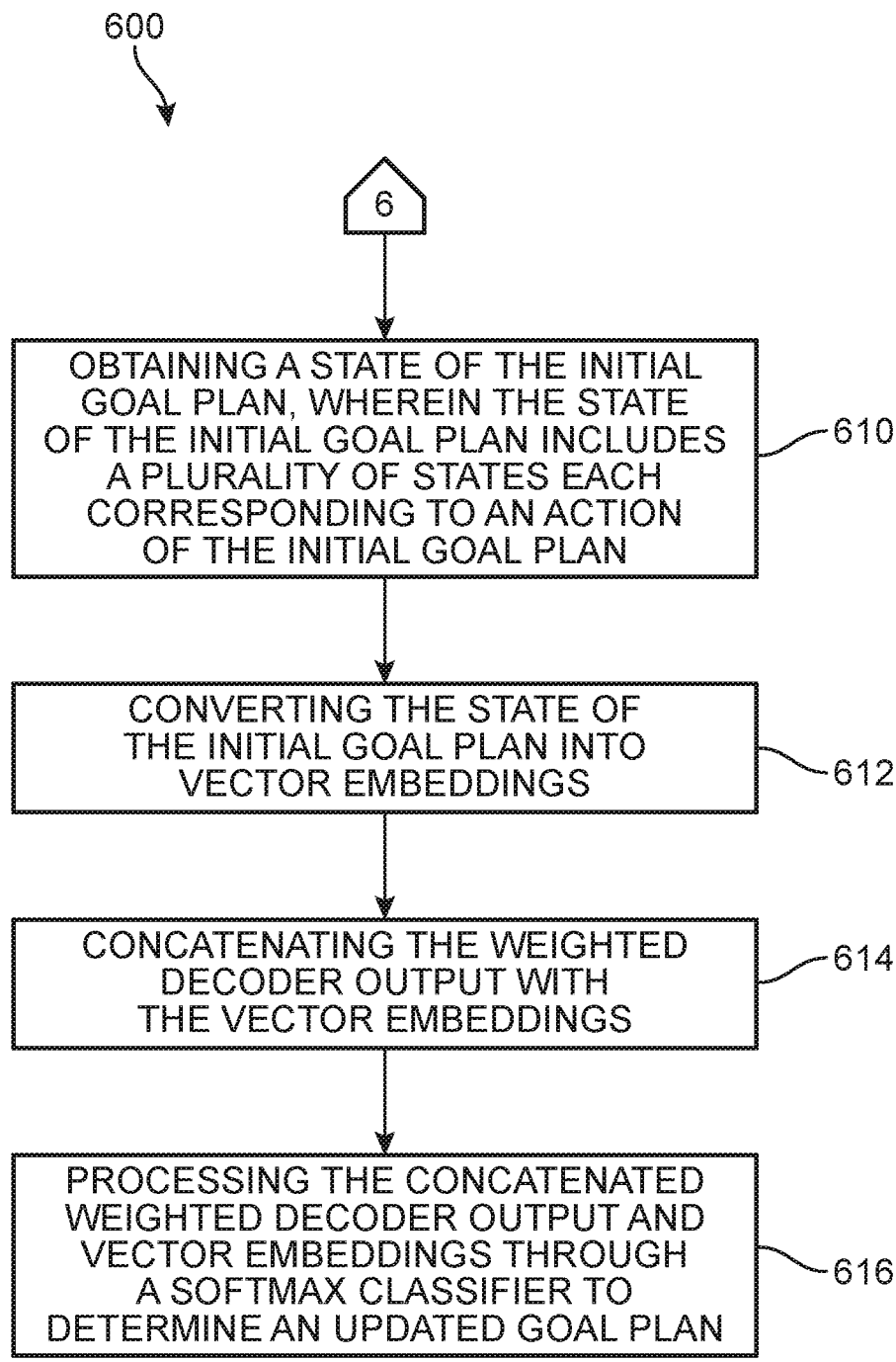

The method of updating a dynamic goal plan may include analyzing an initial sequence of actions defining an initial goal plan and using this analysis, along with the current state of the initial goal plan, to update/redefine the initial goal plan, resulting in an updated goal plan. FIGS. 6-7 show a flowchart illustrating a method of updating a dynamic goal plan 600 (method 600) according to an embodiment.

Method 600 includes receiving an initial goal plan comprising an initial action sequence including a plurality of actions ordered in a forward direction (operation 602). For example, as shown in FIG. 5, an action sequence 502 (or input 502) is input into the sequence to sequence model. The action sequence may include a plurality of actions provided in a string in which the actions are arranged in a particular order. These actions may be those used to define a goal (e.g., during a process shown in FIG. 1) and may be in an order determined by the goal plan module at any stage of the lifecycle of the goal plan. Throughout the description of method 600, the action sequence input into the sequence to sequence model may be described as the initial action sequence to clarify that this it the action sequence being transformed throughout the process. However, it is understood that the initial action sequence may not be the original action sequence and may be an action sequence from a previous iteration of running the sequence to sequence model.

Method 600 includes processing the initial action sequence through an encoder of a bidirectional recurrent neural network ("RNN") to generate an encoder output, including a first hidden state representation (operation 604). For example, as shown in FIG. 5, input 502 is input into embedding layer 504. The encoder may convert the action sequence into a vector embedding including a string of tokens in which the tokens are arranged in a particular order.

Method 600 includes processing the encoder output through a decoder of the bidirectional RNN to generate a decoder output, including a forward hidden state representation and a backward hidden state representation for each action of the initial action sequence (operation 606). As shown by the arrows extending from encoder 504 to each LSTM of first decoder 506 in FIG. 5, tokens each representing an action of actions sequence 502 may be inputted into each LSTM block of decoder 506, such that decoder 506 can analyze the position and importance of each action within the action sequence. This analysis can determine which actions are more or less relevant to the order of the sequence with respect to one another. In other words, the analysis can determine which actions have the most influence over the output of the sequence to sequence model, (i.e., the updated action sequence).

Method 600 includes applying a context vector to the decoder output to generate a weighted decoder output (operation 608). As shown by arrows in FIG. 5, output Π from each LSTM block in decoder 506 is input into attention mechanism 508, which applies weights (context vector, $C_n$) to the tokens representing actions and passes its output of weighted actions to second decoder 508. Higher weights may be applied to actions having more influence over the output, respectively.

Method 600 includes obtaining a state of the initial goal plan, wherein the state of the initial goal plan includes a plurality of states each corresponding to an action of the initial goal plan (operation 610).

Method 600 includes converting the state of the initial goal plan into vector embeddings (operation 612). The state of any goal plan may be captured by several attributes. These attributes can be represented as a vector embedding. State vector embeddings corresponding to the states of each action, as well as the influence of each of these states over the updated goal plan, may be learned through a single layer neural network (not shown) or any clustering-based approach, such as K-means. A clustering-based approach may include converting a plurality of known states to vector embeddings and identifying/labelling clusters of vector embeddings that are similar to one another. These labelled clusters may be used to approximate the present state of a goal plan, which may include a combination of different states corresponding to each action of the goal plan. The methods of using a single layer neural network and clustering-based techniques can help approximate the state of a goal plan that may be capable infinite states. In FIG. 5, the state vector embeddings are shown as $S_1, S_2, \ldots, S_n$.

Method 600 includes concatenating the weighted decoder output with the vector embeddings (operation 614). For example, in some embodiments, a given sequence of paired inputs may include $X=\{(x_t, s)\}, t=1 \ldots T$, where $x_t$ are one-hot encoded action vectors at time step t and s represents the system state as context vectors.

Method 600 includes processing the concatenated weighted decoder output and vector embeddings through a SoftMax classifier to determine an updated goal plan (operation 616). During this operation, the probability distribution over action sequences p(X) may be defined. The joint probability p(Y|X) can be decomposed using the chain rule into a product of conditional probabilities:

The LSTM defines a distribution over outputs and sequentially predicts action sequences using a SoftMax function, e.g., $$P(Y/X) = \pi p(y_t/s_t, x_t)$$
$$t = 1,$$

where Y is the next action sequence. The cross-entropy may be calculated over the SoftMax layer outputs at each time step. A summation for the cross-entropy at each time step may be calculated over the output sequence to compute the loss function. The output of operation 616 includes probabilities of actions in a particular sequence, which define an updated goal plan in which the actions from the initial goal plan may each be rearranged in a new order and/or eliminated. In some embodiments, new actions may be added to the updated goal plan.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of updating a dynamic goal plan, comprising:
    receiving an initial goal plan comprising an initial action sequence including a plurality of actions ordered in a forward direction;
    processing the initial action sequence through an encoder of a bidirectional recurrent neural network ("RNN") to generate an encoder output, including a first hidden state representation;
    processing the encoder output through a decoder of the bidirectional RNN to generate a decoder output, including a forward hidden state representation and a backward hidden state representation for each action of the initial action sequence;

applying a context vector to the decoder output to generate a weighted decoder output;

obtaining a state of the initial goal plan, wherein the state of the initial goal plan includes a plurality of states each corresponding to an action of the initial goal plan;

converting the state of the initial goal plan into vector embeddings;

concatenating the weighted decoder output with the vector embeddings; and processing the concatenated weighted decoder output and vector embeddings through a SoftMax classifier to determine an updated goal plan.

2. The computer implemented method of claim 1, further comprising creating, by a goal plan module, the initial goal plan.

3. The computer implemented method of claim 1, wherein the bidirectional RNN includes one of a long short-term memory (LSTM) and a gated recurrent unit (GRU).

4. The computer implemented method of claim 1, wherein converting the state of the initial goal plan into vector embeddings includes learning vector embeddings through a single layer neural network.

5. The computer implemented method of claim 1, wherein converting the state of the initial goal plan into vector embeddings comprises:

clustering a plurality of known states for the initial goal plan and labeling the clusters.

6. The computer implemented method of claim 1, wherein the initial goal plan includes a different number of actions from the updated goal plan.

7. The computer implemented method of claim 1, wherein the order of the actions in the initial goal plan differs from the order of the actions in the updated goal plan.

8. A non-transitory computer-readable medium storing software comprising instructions executable by one or more computers which, upon such execution, cause the one or more computers to:

receive an initial goal plan comprising an initial action sequence including a plurality of actions ordered in a forward direction;

process the initial action sequence through an encoder of a bidirectional recurrent neural network ("RNN") to generate an encoder output, including a first hidden state representation;

process the encoder output through a decoder of the bidirectional RNN to generate a decoder output, including a forward hidden state representation and a backward hidden state representation for each action of the initial action sequence;

apply a context vector to the decoder output to generate a weighted decoder output;

obtain a state of the initial goal plan, wherein the state of the initial goal plan includes a plurality of states each corresponding to an action of the initial goal plan;

convert the state of the initial goal plan into vector embeddings;

concatenate the weighted decoder output with the vector embeddings; and process the concatenated weighted decoder output and vector embeddings through a SoftMax classifier to determine an updated goal plan.

9. The non-transitory computer-readable medium storing software of claim 8, wherein the instructions further cause the one or more computers to create, by a goal plan module, the initial goal plan.

10. The non-transitory computer-readable medium storing software of claim 8, wherein the bidirectional RNN includes one of a long short-term memory (LSTM) and a gated recurrent unit (GRU).

11. The non-transitory computer-readable medium storing software of claim 8, wherein converting the state of the initial goal plan into vector embeddings includes learning vector embeddings through a single layer neural network.

12. The non-transitory computer-readable medium storing software of claim 8, wherein converting the state of the initial goal plan into vector embeddings comprises:

clustering a plurality of known states for the initial goal plan and labeling the clusters.

13. The non-transitory computer-readable medium storing software of claim 8, wherein the initial goal plan includes a different number of actions from the updated goal plan.

14. The non-transitory computer-readable medium storing software of claim 8, wherein the order of the actions in the initial goal plan differs from the order of the actions in the updated goal plan.

15. A system for updating a dynamic goal plan, comprising:

one or more computers and one or more storage devices storing instructions that are operable, when executed by the one or more computers, to cause the one or more computers to:

receive an initial goal plan comprising an initial action sequence including a plurality of actions ordered in a forward direction;

process the initial action sequence through an encoder of a bidirectional recurrent neural network ("RNN") to generate an encoder output, including a first hidden state representation;

process the encoder output through a decoder of the bidirectional RNN to generate a decoder output, including a forward hidden state representation and a backward hidden state representation for each action of the initial action sequence;

apply a context vector to the decoder output to generate a weighted decoder output;

obtain a state of the initial goal plan, wherein the state of the initial goal plan includes a plurality of states each corresponding to an action of the initial goal plan;

convert the state of the initial goal plan into vector embeddings;

concatenate the weighted decoder output with the vector embeddings; and process the concatenated weighted decoder output and vector embeddings through a SoftMax classifier to determine an updated goal plan.

16. The system of claim 15, wherein the instructions further cause the one or more computers to create, by a goal plan module, the initial goal plan.

17. The system of claim 15, wherein the bidirectional RNN includes one of a long short-term memory (LSTM) and a gated recurrent unit (GRU).

18. The system of claim 15, wherein converting the state of the initial goal plan into vector embeddings includes learning vector embeddings through a single layer neural network.

19. The system of claim 15, wherein converting the state of the initial goal plan into vector embeddings comprises:

clustering a plurality of known states for the initial goal plan and labeling the clusters.

20. The system of claim 15, wherein the initial goal plan includes a different number of actions from the updated goal plan.

\* \* \* \* \*